US012780732B2

(12) United States Patent
Sorger

(10) Patent No.: US 12,780,732 B2
(45) Date of Patent: Nov. 3, 2026

(54) MIXTURES CONTAINING SUPERABSORBERS

(71) Applicant: WACKER CHEMIE AG, Munich (DE)

(72) Inventor: Klas Sorger, Munich (DE)

(73) Assignee: Wacker Chemie AG, Munich (DE)

(*) Notice: Subject to any disclaimer, the term of this patent is extended or adjusted under 35 U.S.C. 154(b) by 943 days.

(21) Appl. No.: 17/920,409

(22) PCT Filed: Apr. 22, 2020

(86) PCT No.: PCT/EP2020/061240

§ 371 (c)(1),
(2) Date: Oct. 21, 2022

(87) PCT Pub. No.: WO2021/213652

PCT Pub. Date: Oct. 28, 2021

(65) Prior Publication Data

US 2023/0159394 A1 May 25, 2023

(51) Int. Cl.

| | |
|---|---|
| ***C04B 24/26*** | (2006.01) |
| ***C04B 14/06*** | (2006.01) |
| ***C04B 18/24*** | (2006.01) |
| ***C04B 24/06*** | (2006.01) |
| ***C04B 24/38*** | (2006.01) |
| ***C04B 28/02*** | (2006.01) |
| ***C04B 40/00*** | (2006.01) |
| *C04B 103/00* | (2006.01) |
| *C04B 111/00* | (2006.01) |

(52) U.S. Cl.

CPC .......... *C04B 24/2652* (2013.01); *C04B 14/06* (2013.01); *C04B 18/24* (2013.01); *C04B 24/06* (2013.01); *C04B 24/2635* (2013.01); *C04B 24/2641* (2013.01); *C04B 24/383* (2013.01); *C04B 28/02* (2013.01); *C04B 40/0039* (2013.01); *C04B 2103/0051* (2013.01); *C04B 2111/00482* (2013.01); *C04B 2111/00637* (2013.01); *C04B 2111/00672* (2013.01)

(58) Field of Classification Search

CPC ..... C04B 24/2652; C04B 14/06; C04B 18/24; C04B 24/06; C04B 24/2635; C04B 24/2641; C04B 24/383; C04B 28/02; C04B 40/0039

See application file for complete search history.

(56) References Cited

U.S. PATENT DOCUMENTS

| | | | | |
|---|---|---|---|---|
| 2011/0104377 | A1* | 5/2011 | Zapf | C08K 3/013 524/4 |
| 2013/0098271 | A1* | 4/2013 | Eberwein | C04B 28/02 106/806 |
| 2018/0230053 | A1* | 8/2018 | Chiaverini | C04B 40/0046 |

FOREIGN PATENT DOCUMENTS

| | | | |
|---|---|---|---|
| CN | 1665757 | A | 9/2005 |
| CN | 103068767 | A | 4/2013 |
| CN | 105764940 | A | 7/2016 |
| CN | 109437658 | B | 7/2021 |
| DE | 19539250 | A1 | 5/1996 |
| DE | 10218259 | A1 | 11/2003 |
| DE | 102007027470 | A1 | 12/2008 |
| EP | 0530768 | B1 | 2/1996 |
| EP | 1329435 | A1 | 7/2003 |
| EP | 1506979 | A1 | 2/2005 |
| EP | 1916275 | B1 | 5/2012 |
| EP | 2499104 | B1 | 5/2016 |
| EP | 2388243 | B1 | 2/2020 |
| WO | 2006023698 | A2 | 3/2006 |
| WO | 2008151878 | A1 | 12/2008 |
| WO | 2008151879 | A1 | 12/2008 |
| WO | 2017025770 | A1 | 2/2017 |
| WO | 2020187740 | A1 | 9/2020 |

OTHER PUBLICATIONS

Polymer Handbook 2nd Edition, J. Wiley & Sons, New York (1975).
Fox T. G., Bull. Am. Physics Soc. 1, 3, p. 123 (1956).

* cited by examiner

*Primary Examiner* — John E Uselding

(57) ABSTRACT

A mixture along with methods of preparing, uses and/or products made from the mixture and methods of preparing products made from the same. Where the mixture contains 0.5% to 10% by weight of one or more superabsorbent polymers and 90% to 99.5% by weight of one or more protective-colloid-stabilized polymers based on one or more ethylenically unsaturated monomers and optionally one or more additives. Where the percentages by weight are based on the dry weight of the mixture and wherein no mineral binder is present within the mixture.

10 Claims, No Drawings

MIXTURES CONTAINING SUPERABSORBERS

CROSS-REFERENCE TO RELATED APPLICATIONS

This application is a U.S. National Phase application of PCT Application NO. PCT/EP2020/061240 filed on Apr. 22, 2022, which is incorporated by reference herein in its entirety.

The invention relates to mixtures comprising superabsorbers and additives, to processes for the production thereof, to processes for producing building material formulations using the mixtures, and to the use of the mixtures, for example in tile adhesives, leveling compounds, sealing slurries or for producing thermal insulation composite systems.

Building material formulations are generally based on mineral binders such as cement or gypsum, fillers, and additives and are used for example as coatings or adhesives, such as tile adhesives, spackling compounds, leveling compounds or jointing mortars or in the production of thermal insulation composite systems. Through the addition of additives, the building material formulations are tailored to the specific requirements of the respective use and of the respective place of use and the desired product properties are adjusted. Common additives are protective-colloid-stabilized, water-redispersible polymer powders (dispersion powders), thickeners, especially cellulose ethers, setting accelerators, setting retarders, fibers, foam stabilizers, and many others. Dispersible polymer powders are used to improve the properties of hardened mortars, such as adhesion, abrasion resistance, scratch resistance or flexural strength, but are not generally used to adjust the properties of the fresh mortar. For example, fibers boost the crack-bridging properties or the flexural strength of hardened mortars. Dispersants are used to disperse finely divided additives in order that these do not agglomerate but are evenly distributed in the hardened mortar and that the hardened mortar has a homogeneous property profile. Pigments are used to add color to the hardened mortars. With thickeners too, the water retention capacity thereof influences the hydration of the mineral binder and thus ultimately the strength of the hardened mortar.

In addition to the properties of the hardened mortar, what is also important for the user are the properties of the fresh mortar, such as adhesiveness, wetting properties, workability or creamy consistency of the fresh mortar, and also the ability to correct the fresh mortar layer during application or the ability to correct tiles laid in the mortar layer. This is influenced significantly for example by the viscosity or the wetting properties of the fresh mortar. For instance, less viscous tile adhesives having a creamy consistency are easier to apply using a notched trowel to substrates, and tiles can be corrected more easily after they have been laid in the mortar bed. At the same time, the fresh mortars should be stable and not slide down the substrate even when applied vertically. The production of thermal insulation composite systems too is made easier with less viscous reinforcing mortars, since reinforcing fabric or insulation panels can be laid therein more easily. By increasing the wetting properties of the fresh mortar, the interaction, and thus the adhesion capacity, of the hardened mortar on the substrate and the durability of the bond can be improved. Such advantages are particularly important, for example, when laying modern tiles that have low water absorption.

The properties of fresh mortars are commonly adjusted with cellulose ethers as thickeners. Cellulose ethers are however costly, consequently ways are being sought to reduce the amounts of cellulose ether used. Moreover, the individual cellulose ether derivatives mostly have a narrow spectrum of activity, which means that specific cellulose ether derivatives are in each case required for the achievement of specific properties or for specific mortar recipes, which complicates the creation of mortar recipes, and which is why compounders or manufacturers of building material formulations need to have at their disposal a large number of cellulose ether derivatives. It is for this reason too that there is a desire to reduce the use of cellulose ethers without downgrading the properties of the fresh mortar.

Against this background, one object was to provide fresh mortars having lower viscosity and increased wetting properties. In doing so, it should preferably also be possible to reduce the amounts of cellulose ethers used in building material formulations, if possible without adversely affecting the abovementioned properties of the fresh mortar.

Surprisingly, the object was achieved with mixtures based on superabsorbers and additives selected from the group comprising protective-colloid-stabilized polymers of ethylenically unsaturated monomers, thickeners, setting accelerators, setting retarders, defoamers and fibers, with the mixtures containing no mineral binders. It was specifically the introduction of the superabsorbers and the additives into the mortar in the form of a premix of this kind that resulted in the object of the invention being achieved.

The use of superabsorbers in mortars per se is known for example from EP1329435, DE102007027470, WO2008/151879 or WO2008/151878. For the production of dry mortars, the superabsorbers and the other constituents were introduced in the form of separate components. These documents also aim to reduce the amounts of dispersible polymer powders in mortars. In addition to superabsorbers, the dry mortars of EP2499104 also comprise, as dispersants, branched comb polymers having polyether side chains, melamine-formaldehyde condensates or naphthalene sulfonate-formaldehyde condensates, which act as flow improvers. Flow improvers, plasticizers, and superplasticizers are generally not crosslinked polymers and do not form hydrogels in water, but instead have a plasticizing effect in aqueous formulations.

EP2388243 describes compositions of water-redispersible polymer powders and superplasticizers—so-called polycarboxylate ethers—based on (meth)acrylic acid and ethylenically unsaturated polyalkylene oxides, and also the use of such compositions in dry mortars. Superabsorbers generally do not have plasticizing properties and are known to differ chemically from plasticizers. DE19539250 describes a setting additive for cement preparations which, in addition to a water-soluble polyalkylene oxide and superabsorbers, also comprises a concrete superplasticizer, such as styrene-maleic anhydride.

The invention provides mixtures comprising one or more superabsorbent polymers (superabsorbers) and one or more additives selected from the group comprising protective-colloid-stabilized polymers based on one or more ethylenically unsaturated monomers, thickeners, setting accelerators, setting retarders, defoamers, and fibers, and optionally one or more additives, with the proviso that no mineral binders are present.

In the mixtures, the superabsorbers and the additives are preferably present as separate constituents, in particular as separate particulate components. The mixtures may be present for example in the form of powders, especially in the form of water-dispersible or soluble powders, or in the form of aqueous dispersions or solutions. Preference is given to water-dispersible powders and to aqueous dispersions or solutions in particular.

The mixtures contain preferably ≥30% by weight, more preferably ≥70% by weight, and most preferably ≥90% by weight, of additives and superabsorbers, based on the dry weight of the mixtures. Most preferably, the mixtures consist exclusively of superabsorbers and additives.

The mixtures contain preferably ≥30% by weight, more preferably ≥80% by weight, and most preferably ≥90% by weight, of additives. The mixtures contain preferably ≤99.99% by weight, more preferably ≤99.9% by weight, and most preferably ≤99.5% by weight, of additives. The percentages by weight relate to the dry weight of the mixtures.

Preferred additives are thickeners and especially protective-colloid-stabilized polymers based on ethylenically unsaturated monomers.

The mixtures contain preferably ≥0.01% by weight, more preferably ≥0.1% by weight, and most preferably ≥0.5% by weight, of superabsorbers. The mixtures contain preferably ≤70% by weight, more preferably ≤20% by weight, and most preferably ≤10% by weight, of superabsorbers. The percentages by weight relate to the dry weight of the mixtures.

Superabsorbers are generally copolymers that are swellable in water or in aqueous salt solutions. Contact with water or aqueous systems generally results in swelling and the absorption of water, with the formation of hydrogels. The pulverulent superabsorber is able to absorb many times its weight of water. Hydrogels are generally understood to mean water-containing gels based on hydrophilic but crosslinked water-insoluble polymers that are in the form of three-dimensional networks. Superabsorbers are generally water-insoluble. Superabsorbers are in particular crosslinked anionic or cationic polyelectrolytes of high molecular weight obtainable by free-radical-initiated polymerization of ethylenically unsaturated vinyl compounds and optionally subsequent drying of the copolymers thereby obtained. Preference is given to anionic polyelectrolytes and to polyelectrolytes bearing carboxylic acid groups in particular. The ethylenically unsaturated vinyl compounds generally include crosslinking monomers, especially multiply ethylenically unsaturated monomers.

Preferred superabsorbers are crosslinked polymers having acid groups such as carboxylic acid groups, which are preferably present entirely or partially, especially predominantly, in the form of salts thereof, generally alkali metal or ammonium salts.

Superabsorbers are based preferably on

- one or more ethylenically unsaturated monomers bearing ionic groups,
- one or more crosslinking, ethylenically unsaturated monomers,
- optionally one or more monoethylenically unsaturated, nonionic monomers bearing (meth)acrylamido groups, and
- optionally one or more other monoethylenically unsaturated hydrophilic monomers.

The ethylenically unsaturated monomers bearing ionic groups preferably bear either anionic groups, especially acid groups, or cationic groups.

The superabsorbers contain monomer units bearing ionic groups to an extent of preferably 9 to 70 mol %, more preferably 13 to 60 mol %, and most preferably 18 to 50 mol %.

Ethylenically unsaturated monomers bearing acid groups can be for example monoethylenically unsaturated carboxylic acids, especially $C_3$ to $C_{25}$ carboxylic acids and the anhydrides, sulfonic acids or phosphonic acids thereof.

Examples of monoethylenically unsaturated carboxylic acids are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, and fumaric acid. Examples of monoethylenically unsaturated sulfonic acids are vinylsulfonic acid, allylsulfonic acid, sulfoethyl acrylate, sulfomethacrylate, sulfopropyl acrylate, sulfopropyl methacrylate, allylhydroxypropanesulfonic acid, 2-hydroxy-3-acryloyloxypropylsulfonic acid, 2-hydroxy-3-methacryloyloxypropylsulfonic acid, styrenesulfonic acid, 2-acrylamido-2-methylpropanesulfonic acid, 2-methacrylamido-2-methylpropanesulfonic acid, 2-acrylamidobutanesulfonic acid, and 2-acrylamido-2,4,4-trimethylpentanesulfonic acid. Examples of monoethylenically unsaturated phosphonic acids are vinylphosphonic acid and allylphosphonic acid.

Preferred ethylenically unsaturated monomers bearing acid groups are acrylic acid, methacrylic acid, vinylsulfonic acid, acrylamidopropanesulfonic acid, 2-methacrylamido-2-methylpropanesulfonic acid, 2-acrylamidobutanesulfonic acid, and 2-acrylamido-2,4,4-trimethylpentanesulfonic acid. Particular preference is given to acrylic acid and methacrylic acid.

Examples of ethylenically unsaturated monomers bearing cationic groups are [2-(acryloyloxy)ethyl]trimethylammonium salts, [2-(methacryloyloxy)ethyl]trimethylammonium salts, [3-(acryloylamino)propyl]trimethylammonium salts, and [3-(methacryloylamino)propyl]trimethylammonium salts. The salts are preferably in the form of halides or methosulfates.

The crosslinking, ethylenically unsaturated monomers used may be for example post-crosslinking monomers or, preferably, pre-crosslinking monomers.

The superabsorbers contain crosslinking monomer units to an extent of preferably 0.01 to 15 mol %, more preferably 0.02 to 5 mol %, and most preferably 0.05 to 1 mol %.

Pre-crosslinking monomers are generally multiply ethylenically unsaturated monomers, for example multiply (meth)acrylic-functional monomers such as butane-1,4-diol di(meth)acrylate, 1,3-butylene glycol diacrylate, 1,3-butylene glycol dimethacrylate, diethylene glycol diacrylate, diethylene glycol dimethacrylate, ethylene glycol dimethacrylate, ethoxylated bisphenol A diacrylate, ethoxylated bisphenol A dimethacrylate, ethylene glycol dimethacrylate, hexane-1,6-diol di(meth)acrylate, neopentyl glycol dimethacrylate, polyethylene glycol di(meth)acrylate, triethylene glycol di(meth)acrylate, tripropylene glycol diacrylate, tetraethylene glycol di(meth)acrylate, dipentaerythritol pentaacrylate, pentaerythritol tetraacrylate, pentaerythritol triacrylate, trimethylolpropane tri(meth)acrylate, cyclopentadiene diacrylate, tris(2-hydroxyethyl)isocyanurate triacrylate and/or tris(2-hydroxy)isocyanurate trimethacrylate; monomers having more than one vinyl ester or allyl ester group, such as divinyl esters of polycarboxylic acids, diallyl esters of polycarboxylic acids, triallyl terephthalate, diallyl maleate, diallyl fumarate, trivinyl trimellitate, divinyl adipate and/or diallyl succinate; monomers having more than one (meth)acrylamido group, such as N,N'-methylenebisacrylamide and/or N,N'-methylenebismethacrylamide;

monomers having more than one maleimide group, such as hexamethylenebismaleimide; monomers having more than one vinyl ether or allyl ether group, such as ethylene glycol divinyl ether, triethylene glycol divinyl ether, pentaerythritol triallyl ether, cyclohexanediol divinyl ether, triallyl isocyanurate, triallylamine and/or tetraallylammonium salts, and also pentaerythritol triallyl ether.

Methacrylic-functional monomers are preferred over the acrylic-functional monomers. (Meth)acrylamido-, allylamino-, and allyl ether-functional monomers are especially preferred.

Post-crosslinking monomers generally contain an ethylenically unsaturated group and at least one further functional group. Subsequent crosslinking can take place for example by reacting the further functional group of the post-crosslinking monomers with acid groups. Suitable functional groups are for example hydroxyl, amino, epoxy, and aziridino groups. Examples include hydroxyalkyl esters of monoethylenically unsaturated carboxylic acids, such as 2-hydroxyethyl acrylate, hydroxypropyl acrylate, hydroxybutyl acrylate, hydroxyethyl methacrylate, hydroxypropyl methacrylate, and hydroxybutyl methacrylate, allylpiperidinium bromide, N-vinylimidazoles such as N-vinylimidazole, 1-vinyl-2-methylimidazole, N-vinylimidazolines such as N-vinylimidazoline, 1-vinyl-2-methylimidazoline, 1-vinyl-2-ethylimidazoline or 1-vinyl-2-propylimidazoline, which can be used in the polymerization in the form of the free bases, in quaternized form or as a salt. Also suitable are dialkylaminoethyl acrylate, dimethylaminoethyl methacrylate, diethylaminoethyl acrylate and diethylaminoethyl methacrylate, and glycidyl (meth)acrylate.

Examples of monoethylenically unsaturated, nonionic monomers bearing (meth)acrylamido groups are acrylamide, methacrylamide, N-methyl(meth)acrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide. Preference is given to methylacrylamide, N,N-dimethylacrylamide, and methacrylamide, and particular preference to acrylamide.

The superabsorbers are based on monoethylenically unsaturated, nonionic monomers bearing (meth)acrylamido groups to an extent of preferably 30 to 90 mol %, more preferably 40 to 85 mol %, and most preferably 50 to 80 mol %.

The other monoethylenically unsaturated, hydrophilic monomers are preferably selected from the group comprising acrylonitrile, methacrylonitrile, vinylpyridine, vinylpyrolidone, vinylcaprolactam, vinyl acetate, and (meth)acrylic esters bearing hydroxy groups, such as hydroxyethylacrylic acid, hydroxypropylacrylic acid, and hydroxypropylmethacrylic acid.

The superabsorbers are based on monoethylenically unsaturated, hydrophilic monomers to an extent of preferably 0 to 30 mol %, more preferably 1 to 20 mol %.

Preferred superabsorbers are based on 19.9 to 49.9 mol % of 2-acrylamido-2-methylpropanesulfonic acid, 50 to 80 mol % of acrylamide, and also a crosslinking monomer selected from the group comprising triallylamine, N,N'-methylenebisacrylamide, and pentaerythritol triallyl ether, 19.9 to 49.9 mol % of (meth)acrylic acid, 50 to 80 mol % of acrylamide, and also a crosslinking monomer selected from the group comprising triallylamine, N,N'-methylenebisacrylamide, and pentaerythritol triallyl ether; 19.9 to 49.9 mol % of [3-(acryloylamino)propyl]trimethylammonium chloride, 50 to 80 mol % of acrylamide, and a crosslinking monomer selected from the group comprising triallylamine, N,N'-methylenebisacrylamide, and pentaerythritol triallyl ether.

The superabsorbers are preferably in solid form, especially in the form of a powder. Particularly preferably, the superabsorbers are in aqueous form. Superabsorbers in solid form have a particle size distribution such that preferably ≥98% by weight passes through a 2000 μm mesh sieve, more preferably ≥95% by weight through a 500 μm mesh sieve, and most preferably ≥90% by weight though a 400 μm mesh sieve (determination in accordance with the edana 420.2-02 standard).

The superabsorbers are able to absorb preferably ≥5 g, more preferably ≥15 g and most preferably ≥20 g, of water, based on 1 g of superabsorber in solid form. The determination may for example be carried out in analogous manner to the edana 440.2-02 standard, as stated in paragraph 83 of EP2499104B1.

The superabsorbers can be produced in a conventional manner, as described for example in EP2499104.

The polymers of ethylenically unsaturated monomers are based preferably on one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins or dienes, vinylaromatics or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 5 to 13 carbon atoms, for example VeoVa9R or VeoVa10R (trade names of Shell). Particular preference is given to vinyl acetate.

Preferred methacrylic esters or acrylic esters are esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Particular preference is given to methyl acrylate, methyl methacrylate, n-butyl acrylate, and 2-ethylhexyl acrylate.

Preferred olefins or dienes are ethylene, propylene, and 1,3-butadiene. Preferred vinyl aromatics are styrene and vinyltoluene. A preferred vinyl halide is vinyl chloride.

It is optionally also possible to copolymerize auxiliary monomers, more particularly 0% to 20% by weight, preferably 0.1% to 10% by weight, based on the total weight of the base polymer. Examples of auxiliary monomers are ethylenically unsaturated mono- and dicarboxylic acids, preferably acrylic acid, methacrylic acid, fumaric acid, and maleic acid; ethylenically unsaturated carboxylic acid amides and carboxylic acid nitriles, preferably acrylamide and acrylonitrile; mono- and diesters of fumaric acid and maleic acid, such as the diethyl and diisopropyl esters, and also maleic anhydride, ethylenically unsaturated sulfonic acids or salts thereof, preferably vinylsulfonic acid, and 2-acrylamido-2-methylpropanesulfonic acid. Further examples are pre-crosslinking comonomers such as multiply ethylenically unsaturated comonomers, for example divinyl adipate, diallyl maleate, allyl methacrylate or triallyl cyanurate, or post-crosslinking comonomers, for example acrylamidoglycolic acid (AGA), methyl methylacrylamidoglycolate (MMAG), N-methylolacrylamide (NMA), N-methylolmethacrylamide (NMMA), N-methylol allyl carbamate, alkyl ethers such as the isobutoxy ether or ester of N-methylol acrylamide, of N-methylol methacrylamide, and of N-methylol allyl carbamate. Also suitable are epoxy-functional comonomers such as glycidyl methacrylate and glycidyl acrylate. Further examples are silicon-functional comonomers, such as acryloyloxypropyltrialkoxy and methacryloyloxypropyltrialkoxy silanes, vinyltrialkoxysilanes, and vinylmethyldialkoxysilanes, wherein it is possible for the alkoxy groups to be present for example in the form of methoxy radicals, ethoxy radicals, and ethoxypropylene glycol ether radicals. Mention should also be made of monomers having hydroxy or CO groups, for example hydroxyalkyl methacrylates and acrylates such as hydroxyethyl, hydroxypropyl or hydroxybutyl acrylate or methacrylate, and also compounds such as diacetone acrylamide and acetylacetoxyethyl acrylate or methacrylate. Further examples include also vinyl ethers such as methyl, ethyl, or isobutyl vinyl ether.

Examples of suitable homo- and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

Preference is given to vinyl acetate homopolymers; copolymers of vinyl acetate with 1% to 40% by weight of ethylene; copolymers of vinyl acetate with 1% to 40% by weight of ethylene and 1% to 50% by weight of one or more further comonomers from the group of the vinyl esters having 1 to 12 carbon atoms in the carboxyl radical, such as vinyl propionate, vinyl laurate, vinyl esters of alpha-branched carboxylic acids having 5 to 13 carbon atoms, such as VeoVa9R, VeoVa10R, VeoVa11R; copolymers of vinyl acetate, 1% to 40% by weight of ethylene, and preferably 1% to 60% by weight of acrylic esters of unbranched or branched alcohols having 1 to 15 carbon atoms, especially n-butyl acrylate or 2-ethylhexyl acrylate; and copolymers with 30% to 75% by weight of vinyl acetate, 1% to 30% by weight of vinyl laurate or vinyl esters of an alpha-branched carboxylic acid having 5 to 13 carbon atoms, and also 1% to 30% by weight of acrylic esters of unbranched or branched alcohols having 1 to 15 carbon atoms, especially n-butyl acrylate or 2-ethylhexyl acrylate, which may additionally contain 1% to 40% by weight of ethylene; copolymers with vinyl acetate, 1% to 40% by weight of ethylene, and 1% to 60% by weight of vinyl chloride; wherein the polymers may each additionally contain the auxiliary monomers mentioned in the amounts mentioned, and the percentages by weight add up to 100% by weight in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; styrene-acrylic ester copolymers with one or more monomers from the group consisting of methyl acrylate, ethyl acrylate, propyl acrylate, n-butyl acrylate, and 2-ethylhexyl acrylate; vinyl acetate-acrylic ester copolymers with one or more monomers from the group consisting of methyl acrylate, ethyl acrylate, propyl acrylate, n-butyl acrylate, 2-ethylhexyl acrylate, and optionally ethylene; styrene-1,3-butadiene copolymers; wherein the polymers may additionally contain the auxiliary monomers mentioned in the amounts mentioned, and the percentages by weight add up to 100% by weight in each case.

The monomer selection and the selection of the proportions by weight of the comonomers is made so as to generally result in a glass transition temperature Tg of −50° C. to +50° C., preferably −30° C. to +40° C. The glass transition temperature Tg of the polymers can be determined in a known manner by differential scanning calorimetry (DSC). The approximate Tg can also be precalculated by means of the Fox equation. According to Fox T. G., Bull. Am. Physics Soc. 1, 3, page 123 (1956): $1/Tg=x_1/Tg_1+x_2/Tg_2+ \ldots +x_n/Tg_n$, where $x_n$ is the mass fraction (% by wt./100) of the monomer n, and $Tg_n$ is the glass transition temperature in Kelvin of the homopolymer of the monomer n. Tg values for homopolymers are listed in Polymer Handbook 2nd Edition, J. Wiley & Sons, New York (1975).

Examples of suitable protective colloids are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl, and hydroxypropyl derivatives thereof, dextrins and cyclodextrins; proteins such as casein or caseinate, soy protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and the water-soluble copolymers thereof; melamine-formaldehyde sulfonates, naphthalene-formaldehyde sulfonates, styrene-maleic acid copolymers and vinyl ether-maleic acid copolymers.

Preference is given to partially or fully hydrolyzed polyvinyl alcohols having a degree of hydrolysis of preferably 80 to 100 mol %. Particular preference is given to partially hydrolyzed polyvinyl alcohols having a degree of hydrolysis of 80 to 95 mol %, especially having a Hoeppler viscosity in a 4% aqueous solution of 1 to 30 mPas (Hoeppler method at 20° C., DIN 53015). Most preferred are polyvinyl alcohols having a degree of hydrolysis of 85 to 94 mol %, especially having a Hoeppler viscosity in a 4% aqueous solution of 3 to 15 mPas (Hoppler method at 20° C., DIN 53015). The protective colloids mentioned are obtainable by processes known to those skilled in the art. Protective colloids are present in an amount of preferably 1% to 30% by weight, more preferably 3% to 20% by weight, based on the total weight of the polymers of ethylenically unsaturated monomers.

The protective-colloid-stabilized polymers based on ethylenically unsaturated monomers are preferably in the form of water-redispersible powders and more preferably in the form of aqueous dispersions.

The production of protective-colloid-stabilized polymers is known to those skilled in the art and is described for example in EP1916275.

The mixtures contain preferably 30% to 99.9% by weight, more preferably 80% to 99.7% by weight, and most preferably 90% to 99.5% by weight, of protective-colloid-stabilized polymers based on ethylenically unsaturated monomers, based on the dry weight of the mixtures.

Mixtures comprising protective-colloid-stabilized polymers based on ethylenically unsaturated monomers preferably contain 0.1% to 70% by weight, more preferably 0.3% to 20% by weight, and most preferably 0.5% to 10% by weight, of superabsorbers, based on the dry weight of the mixtures.

Examples of thickeners are polysaccharides such as cellulose ethers and modified cellulose ethers, cellulose esters, starch ethers, guar gum, xanthan gum, polycarboxylic acids such as polyacrylic acid or esters or partial esters thereof or amides or partial amides or alkali metal and alkaline earth metal salts thereof, polyacrylates, polyvinylpyrrolidone, casein or associative thickeners such as for example polyurethane thickeners or polyvinyl alcohols. Polycarboxylic acids or polyacrylates acting as thickeners preferably contain no alkylene oxide unit. Thickeners are generally different from plasticizers. Thickeners are preferably different from protective colloids. Thickeners have molecular weights of preferably >4000 g/mol, more preferably ≥10 000 g/mol, and most preferably ≥20 000 g/mol. Preference is given to methylcellulose ethers, hydroxyethyl methyl cellulose, hydroxypropyl methyl cellulose, and hydroxyethyl cellulose. Preference is given also to inorganic thickeners, especially sheet silicates such as bentonites or hectorites.

The mixtures contain preferably 1% to 99.9% by weight, more preferably 5% to 99% by weight, more preferably 30% to 95% by weight, and most preferably 50% to 90% by weight, of thickeners, based on the dry weight of the mixtures.

Examples of setting accelerators are alkali metal salts and alkaline earth metal salts of inorganic acids such as carbonates, chlorides, sulfates, nitrates or phosphates of alkali metals or alkaline earth metals; aluminum compounds such as alkali metal aluminates; silicates such as metasilicates, disilicates and hydrosilicates; alkali metal hydroxides; alkali metal or alkaline earth metal salts of organic acids such as alkali metal or alkaline earth metal salts of carboxylic acids having 1 to 4 carbon atoms; alkanolamines; singly or doubly $NH_2$-terminated polyalkylene glycols, such as singly or doubly amino-terminated polyethylene glycols (PEOs), singly or doubly amino-terminated polypropylene glycols (PPOs), and singly or doubly amino-terminated EO-PO copolymers.

Preferred setting accelerators are alkali metal carbonates, alkali metal hydroxides, aluminum sulfate, alkali metal aluminates, aluminum hydroxides, alkali metal silicates, alkali metal or alkaline earth metal formates, alkali metal or alkaline earth metal acetates, alkali metal or alkaline earth metal propionates, alkali metal or alkaline earth metal butyrates, alkali metal or alkaline earth metal oxalates, alkali metal or alkaline earth metal malonates, N,N,N',N'-tetrakis (2-hydroxypropyl)ethylenediamine, ethanolamine, diethanolamine, triethanolamine, N-methyldiethanolamine, triisopropanolamine, and N,N-dimethylethanolamine.

Particular preference is given to potassium hydroxide, potassium carbonate, sodium carbonate, potassium aluminate, sulfoaluminates, calcium sulfoaluminate, water glass, calcium formate, calcium acetate, triisopropanolamine, diethanolamine, triethanolamine, and N-methyldiethanolamine.

The mixtures contain preferably 1% to 99.9% by weight, more preferably 5% to 99% by weight, particularly preferably 30% to 95% by weight, and most preferably 50% to 90% by weight, of setting accelerators, based on the dry weight of the mixtures.

Examples of setting retarders are hydroxycarboxylic acids or dicarboxylic acids or salts thereof, alkali metal tetraborates such as sodium tetraborate, phosphates, saccharides such as sucrose, and pentaerythritol.

Preferred hydroxycarboxylic acids are tartaric acid, gluconic acid, citric acid, malic acid, 2-methylmalic acid, and calcium salts thereof. Preferred dicarboxylic acids are oxalic acid, succinic acid, fumaric acid, and itaconic acid. Preferred saccharides are sucrose, glucose, fructose, and sorbitol.

Particular preference is given to tartaric acid, citric acid, and calcium salts thereof, and also to sucrose, glucose, and fructose.

The mixtures contain preferably 1% to 99.9% by weight, more preferably 5% to 90% by weight, and most preferably 40% to 80% by weight, of setting retarders, based on the dry weight of the mixtures.

Fibers may be based for example on natural or synthetic fiber materials, for example on organic or inorganic materials. Fibers are also referred to as fibrids. Examples of natural, organic fibers are cotton, hemp, jute, flax, wood fibers, cellulose, viscose, leather fibers or sisal. Examples of synthetic organic fibers are viscose fibers, polyamide fibers, polyester fibers, polyacrylonitrile fibers, Dralon fibers, polyethylene fibers, polypropylene fibers, polyvinyl alcohol fibers or aramid fibers. Inorganic fibers are for example glass fibers, carbon fibers, mineral wool fibers or metal fibers. Preference is given to cotton fibers, polyacrylonitrile fibers, and cellulose fibers. Preference is given to cellulose fibers. The fibers have a length of preferably 0.1 μm and 16 mm, preferably 0.5 μm to 1 mm, more preferably 1 μm to 500 μm. The cellulose fibers have a fiber diameter of preferably <10 μm.

The mixtures contain preferably 1% to 99.9% by weight, more preferably 5% to 90% by weight, and most preferably 40% to 80% by weight, of fibers, based on the dry weight of the mixtures.

Examples of defoamers are mineral oils, vegetable oils, fats, fatty acids, fatty acid esters, fatty alcohols, metallic soaps, silicones, liquid hydrocarbons, and acetylenic diol derivatives, especially gemini surfactants.

Preference is given to nonylphenol, castor oil, kerosene, liquid paraffin, animal oil, sesame oil, castor oil, oleic acid, stearic acid, diethylene glycol laurate, glycerol monoricinolate, alkenyl succinic acid derivatives, sorbitol monolaurate, sorbitol trioleate, natural wax; linear or branched fatty alcohols, acetylene alcohols, glycols, acrylate polyamine, aluminum stearate, calcium oleate, silicone oil, organically modified polysiloxane, fluorosilicone oil.

Preference is also given to gemini surfactants. Gemini surfactants generally consist of two hydrophilic head groups connected via a spacer, each bearing a usually hydrophobic tail group, as described in EP1916275. Preferred gemini surfactants are alkyne derivatives containing two alcohol groups. Particular preference is given to alkynediol derivatives in which one or both of the alcohol groups are substituted with polyethylene glycol residues.

The mixtures contain preferably 1% to 99.9% by weight, more preferably 5% to 90% by weight, and most preferably 40% to 80% by weight, of defoamers, based on the dry weight of the mixtures.

Examples of additives are preservatives, film-forming aids, dispersants, foam stabilizers, plasticizers, acids, bases, buffers, powder additives, pigments or other dyes, flame retardants such as aluminum hydroxide, biocides and cross-linkers such as metal or semi-metal oxides, especially boric acid or polyborates, or dialdehydes such as glutardialdehyde. Additives are present in the mixtures to an extent of preferably 0% to 30% by weight, more preferably 0.1% to 20% by weight, based on the dry weight of the mixtures. Particular preference is given also to mixtures that do not contain any additive.

The mixtures do not contain any mineral binder. Examples of mineral binders are given hereinbelow.

The mixtures may also comprise one or more fillers. Examples of fillers are given hereinbelow. The mixtures contain preferably ≤70% by weight, more preferably ≤60% by weight, even more preferably ≤50% by weight, and particularly preferably ≤5% by weight, of fillers, based on the dry weight of the mixtures. Most preferably, no fillers are present.

The mixtures preferably contain no plasticizers, superplasticizers and/or flow improvers. It is of course obvious that the use of such compounds can reduce the viscosity of building material formulations. Examples of plasticizers are polyalkylene oxides, especially water-soluble polyalkylene oxides. Examples of superplasticizers are generally (meth)

acrylic acid polymers, especially polycarboxylate ethers such as copolymers of (meth)acrylic acid and ethylenically unsaturated polyalkylene oxides, lignin sulfonates, naphthalene sulfonates, melamine sulfonates, styrene-maleic acid copolymers, styrene-maleic anhydride copolymers or proteins. Examples of flow improvers are branched or unbranched polymers having polyether side chains, especially comb polymers having polyether side chains, naphthalene sulfonate-formaldehyde condensates, and optionally sulfonated melamine resins and melamine sulfonate-formaldehyde condensates.

The invention further provides processes for producing the mixtures by mixing one or more superabsorbers and

- one or more additives selected from the group comprising protective-colloid-stabilized polymers based on one or more ethylenically unsaturated monomers, thickeners, setting accelerators, setting retarders, defoamers, and fibers and optionally one or more additives,
- with the proviso that no mineral binders are used.

Mixtures in the form of dry mixtures can be obtained for example by using one or more or all of the starting materials in aqueous form and subsequently drying them.

Preferably, dry mixtures are produced by mixing starting materials that are in solid form.

Preferably, the mixtures are in aqueous form. For the production thereof, one or more or all of the starting materials may be used in aqueous form. Preferably, dry mixtures are converted into aqueous mixtures by adding water.

The mixing and any drying can be carried out in conventional devices according to processes that are customary per se. The mixing can also be carried out before, during or after any milling of starting materials that are in solid form.

The invention further provides processes for producing building material formulations, especially aqueous building material formulations,

- by mixing one or more mineral binders, optionally one or more fillers, and optionally
- one or more additions, characterized in that
- one or more mixtures are admixed, which comprise
- one or more superabsorbers and
- one or more additives selected from the group comprising protective-colloid-stabilized polymers based on one or more ethylenically unsaturated monomers, thickeners, setting accelerators, setting retarders, defoamers, and fibers with the proviso that the mixtures do not contain any mineral binders.

The building material formulations contain preferably 0.001% to 10% by weight, more preferably 0.005% to 2% by weight, and most preferably 0.01% to 0.8% by weight, of superabsorbers, based on the dry weight of the building material formulations.

The building material formulations contain preferably 0.01% to 60% by weight, more preferably 0.1% to 40% by weight, and most preferably 1% to 25% by weight, of additives, based on the dry weight of the building material formulations.

The building material formulations contain preferably 0.1% to 50% by weight, more preferably 0.5% to 30% by weight, and most preferably 1% to 25% by weight, of protective-colloid-stabilized polymers, based on the dry weight of the building material formulations.

Protective-colloid-stabilized polymers based on one or more ethylenically unsaturated monomers and/or thickeners are preferably introduced into the building material formulations exclusively through the mixtures, i.e. not introduced into the building material formulations separately from the mixtures.

Examples of suitable mineral binders are cement, especially portland cement, aluminate cement, especially calcium sulfoaluminate cement, trass cement, slag cement, magnesia cement, phosphate cement, or blast furnace cement, and also mixed cements, filling cements, fly ash, granulated blast furnace slag, hydrated lime, white hydrated lime, calcium oxide (quicklime) and gypsum, such as the alpha-hemihydrate, beta-hemihydrate, anhydrite or $CaSO_4$ dihydrate. Preference is given to portland cement, aluminate cement, and slag cement, and also to mixed cements, filler cements, hydrated lime, white hydrated lime or gypsum, such as the alpha-hemihydrate or anhydrite.

The building material formulations contain preferably 1% to 90% by weight, more preferably 5% to 45% by weight, and most preferably 10% to 35% by weight, of mineral binders, based on the dry weight of the building material formulations.

Examples of suitable fillers are quartz sand, quartz powder, limestone powder, calcium carbonate, dolomite, clay, chalk, white hydrated lime, talc or mica, rubber granules or hard fillers such as aluminum silicates, corundum, basalt, carbides such as silicon carbide or titanium carbide, or pozzolanic fillers such as fly ash, metakaolin, microsilica, and diatomaceous earth. Preferred fillers are quartz sand, quartz powder, limestone powder, calcium carbonate, calcium magnesium carbonate (dolomite), chalk or white hydrated lime.

Fillers are preferably introduced into the building material formulations separately from the mixtures, i.e. as separate components.

The building material formulations contain preferably 10% to 99% by weight, more preferably 30% to 90% by weight, and most preferably 50% to 85% by weight, of fillers, based on the dry weight of the building material formulations.

Optionally, the building material formulations may also contain additions, for example crosslinkers such as metal oxides or semi-metal oxides, especially boric acid or polyborates, or dialdehydes such as glutardialdehyde, preservatives, film-forming aids, dispersants, foam stabilizers, plasticizers, flow improvers, and flame retardants (for example aluminum hydroxide), dyes or biocides. In addition, it is also possible to add one or more of the additives mentioned above to the building material formulations separately from the mixtures of the invention.

The building material formulations contain preferably 0.001% to 30% by weight, more preferably 0.01% to 8% by weight, and most preferably 0.03% to 4% by weight of additions, based on the dry weight of the building material formulations.

The building material formulations are suitable especially for the production of construction adhesives, leveling compounds, plasters, spackling compounds, jointing mortars, sealing slurries or thermal insulation composite systems. Among construction adhesives, preferred areas of use for the dispersible polymer powder compositions are tile adhesives, skim coats or full heat protection adhesives or embedding mortars, or plasters in general. Preferred areas of application are leveling compounds; more preferably, leveling compounds are screeds and self-leveling spackling compounds for floors.

It is surprisingly possible to improve the properties of the fresh mortar with the mixtures of the invention. For instance, the fresh mortars of the invention have advantageously low viscosity and, associated therewith, a creamy consistency, as desired by the user, and can be easily processed. In addition, the mixtures of the invention are also able to boost the wetting action and adhesiveness of fresh mortars, which, after they have been applied and cured, is reflected in improved adhesion to the substrate, increasing the adhesive tensile strength and durability of the building product.

With the mixtures of the invention, it is also possible to extend the open time and correction time and also the pot life and temporal processing window of the fresh mortar and to counteract premature stiffening or skin formation or even incrustation on the mortar surface. Freshly mixed mortar retains its consistency over a relatively long period of time, even at elevated temperatures of, for example, over 30° C. or 35° C. and is very thermally stable overall. For instance, after the fresh mortar has been applied it is still possible, even after a relatively long period of time, to lay tiles in the mortar bed and correct their position very easily and with less pressure. Similarly, in the production of thermal insulation composite systems, it is possible to lay reinforcing fabric in the embedding mortar over a relatively long period of time in accordance with the invention.

The early and final strength of the hardened mortar can also be improved with the mixtures of the invention. This allows the proportion of binders in the building material formulations to be reduced. As a consequence, the costs and carbon footprint of the building material formulations can be reduced. Overall, the hardened mortars produced in accordance with the invention likewise have the desired properties once the mineral binders have set.

All of these effects can be achieved even with the use of surprisingly small amounts of superabsorbers.

Moreover, by adding the mixtures of the invention to building material formulations, the otherwise customary use of cellulose ethers, such as methyl cellulose, can be reduced and this without downgrading the properties of the fresh mortar or even accompanied by an improvement in the mortar properties. In this way, too, the production costs of building material formulations can be lowered and the work for compounders or manufacturers of building material mixtures that is associated with stocking and using a wide variety of cellulose ether derivatives for specific use in a particular mortar can be reduced. Thus, by using the mixtures of the invention, the amount of cellulose ethers used can be reduced by preferably 5% to 100% by weight, more preferably 10% to 60% by weight, and most preferably 15% to 50% by weight, based on the amounts of cellulose ethers used in conventional building material formulations (dry/dry).

A particular surprise here was that all of these effects were achieved by first mixing the superabsorbers and the additives of the invention and introducing them into the building material formulations in this form. These effects could not be achieved by conventional separate introduction of the superabsorbers and additives into the building material formulations.

The following examples serve to elucidate the invention in more detail and are not to be understood as being limiting in any way.

Information on the starting materials:

- Starvis S 5514 F (trade name of BASF): Superabsorber;
- Superabsorber II: Crosslinked copolymer of sodium polyacrylate and acrylic acid;
- VINNAPAS 5010 N (trade name of Wacker Chemie): Water-redispersible, polyvinyl alcohol-stabilized vinyl acetate-ethylene copolymer;
- Tylose H 300 P2 (Trade name of SE Tylose): Methylcellulose;
- Casucol Fix 1 (trade name of Avebe): Starch ether;
- Agitan P804 (trade name of Munzing Chemie): Defoamer:
- Arbocel PWC (trade name of J. Rettenmaier & Sons): Cellulose fiber.

EXAMPLE 1

Preparation of the Mixtures:

For the production of mixtures a) to h), the superabsorbers and additives specified hereinbelow were mixed in an Eirich mixer for a total of 10 min at room temperature.

a) 30 g of Starvis S 5514 F and 970 g of VINNAPAS 5010 N;
b) 30 g of superabsorber II and 970 g of VINNAPAS 5010 N;
c) 30 g of superabsorber II and 500 g of calcium formate;
d) 30 g of superabsorber II and 50 g of starch ether Casucol Fix 1;
e) 30 g of superabsorber II and 40 g of defoamer Agitan P804;
f) 30 g of superabsorber II and 50 g of Arbocel PWC 500;
g) 30 g of superabsorber II and 550 g of Tylose H 300 P2;
h) 30 g of superabsorber II and 50 g of tartaric acid.

EXAMPLE 2

Preparation of the Aqueous Mixtures:

The mixtures a) to h) were mixed for 5 min at room temperature in a Thinky ARE 250 planetary mixer with the amounts of water specified below.

a) 2 g of the dispersible mixtures from example 1a was dispersed in 44 ml of water;
b) 2 g of the dispersible mixtures from example 1b was dispersed in 40 ml of water;
c) 1.06 g of the dispersible mixtures from example 1c was dispersed in 40 ml of water;
d) 0.16 g of the dispersible mixtures from example 1d was dispersed in 44 ml of water;
e) 0.14 g of the dispersible mixtures from example 1e was dispersed in 40 ml of water;
f) 0.6 g of the dispersible mixtures from example 1f was dispersed in 44 ml of water;
g) 1.16 g of the dispersible mixtures from example 1g was dissolved in 40 ml of water. The solution was allowed to stand at room temperature for 24 h to degas;
h) 0.16 g of the dispersible mixtures from example 1h was dissolved in 40 ml of water.

EXAMPLE 3

Production of the Dry Mortars:

320.0 g of Milke CEM I 42.5N cement, 331.3 g of F31 quartz sand, 331.0 g of F36 quartz sand, and the further components specified for the respective reference mortar or test mortar were mixed in a Toni mixer for 15 min.

a) Reference mortar:

5.0 g of calcium formate, 2.7 g of Tylose MH 60.004 P6, 0.3 g of Starvis S 5514 F, and 9.7 g of VINNAPAS 5010 N;

Test mortar:

5.0 g of calcium formate and 2.7 g of Tylose MH 60.004 P6;

b) Reference mortar:

5.0 g of calcium formate, 2.7 g of Tylose MH 60.004 P6, 0.3 g of superabsorber II, and 9.7 g of VINNAPAS 5010 N;

Test mortar:

5.0 g of calcium formate and 2.7 g of Tylose MH 60.004 P6;

c) Reference mortar:

9.7 g of VINNAPAS 5010 N, 2.7 g of Tylose MH 60.004 P6, 5.0 g of calcium formate, and 0.3 g of superabsorber II;

Test mortar:

9.7 g of VINNAPAS 5010 N and 2.7 g of Tylose MH 60.004 P6;

d) Reference mortar:

5.0 g of calcium formate, 9.7 g of VINNAPAS 5010 N, 2.7 g of Tylose MH 60.004 P6, 0.3 g of superabsorber II, and 0.5 g of Casucol Fix 1;

Test mortar:

5.0 g of calcium formate, 9.7 g of VINNAPAS 5010 N, and 2.7 g of Tylose MH 60.004 P6;

e) Reference mortar:

5.0 g of calcium formate, 9.7 g of VINNAPAS 5010 N, 2.7 g of Tylose MH 60.004 P6, 0.3 g of superabsorber II, and 0.4 g of Agitan P 804;

Test mortar:

5.0 g of calcium formate, 9.7 g of VINNAPAS 5010 N, and 2.7 g of Tylose MH 60.004 P6;

f) Reference mortar:

5.0 g of calcium formate, 9.7 g of VINNAPAS 5010 N, 2.7 g of Tylose MH 60.004 P6, 0.5 g of Arbocel PWC 500, and 0.3 g of superabsorber II;

Test mortar:

5.0 g of calcium formate, 9.7 g of VINNAPAS 5010 N, and 2.7 g of Tylose MH 60.004 P6;

g) Reference mortar:

5.0 g of calcium formate, 9.7 g of VINNAPAS 5010 N, 0.3 g of superabsorber II, and 5.5 g of Tylose H 300 P2;

Test mortar:

5.0 g of calcium formate and 9.7 g of VINNAPAS 5010 N, h) Reference mortar:

5.0 g of calcium formate, 9.7 g of VINNAPAS 5010 N, 2.7 g of Tylose MH 60.004 P6, 0.5 g of tartaric acid, and 0.3 g of superabsorber II;

Test mortar:

5.0 g of calcium formate, 9.7 g of VINNAPAS 5010 N, and 2.7 g of Tylose MH 60.004 P6.

EXAMPLE 4

Production of the Fresh Mortars:

The respective dry mortar from example 3 was made by mixing with a hand mixer for 20 sec using the components specified below.

a) Reference mortar:

200 g of the reference mortar from example 3a and 44 ml of water;

Test mortar:

198 g of the test mortar from example 3a and also the aqueous mixture from example 2a;

b) Reference mortar:

200 g of the reference mortar from example 3b and 40 ml of water;

Test mortar:

198 g of the test mortar from example 3b and also the aqueous mixture from example 2b;

c) Reference mortar:

200 g of the reference mortar from example 3c and 40 ml of water;

Test mortar:

198.9 g of the test mortar from example 3c and also the aqueous mixture from example 2c;

d) Reference mortar:

200.1 g of the reference mortar from example 3d and 44 ml of water;

Test mortar:

199.9 g of the test mortar from example 3d and also the aqueous mixture from example 2d;

e) Reference mortar:

200.1 g of the reference mortar from example 3e and 40 ml of water;

Test mortar:

199.9 g of the test mortar from example 3e and also the aqueous mixture from example 2e;

f) Reference mortar:

200.1 g of the reference mortar from example 3f and 44 ml of water;

Test mortar:

199.9 g of the test mortar from example 3f and also the aqueous mixture from example 2f;

g) Reference mortar:

200.6 g of the reference mortar from example 3g and 40 ml of water;

Test mortar:

199.4 g of the test mortar from example 3g and also the aqueous mixture from example 2g;

h) Reference mortar:

200.1 g of the reference mortar from example 3h and 40 ml of water;

Test mortar:

199.9 g of the test mortar from example 3h and also the aqueous mixture from example 2h.

TABLE 1

Properties of the fresh mortars from example 4:

| | Viscosity [mPa · s] | | Wettability | | |
|---|---|---|---|---|---|
| Example | Reference mortar | Test mortar | Time [min] | Reference mortar [%] | Test mortar [%] |
| 4a) | 589.000 | 527.000 | 10 | 90 | 95 |
| | | | 20 | 70 | 90 |
| | | | 30 | 35 | 75 |
| 4b) | 972.000 | 893.000 | 10 | 85 | 95 |
| | | | 20 | 65 | 80 |
| | | | 30 | 35 | 45 |
| 4c) | 810.000 | 682.000 | 10 | 80 | 95 |
| | | | 20 | 60 | 80 |
| | | | 30 | 25 | 45 |
| 4d) | 770.000 | 643.000 | 10 | 90 | 95 |
| | | | 20 | 65 | 85 |
| | | | 30 | 35 | 55 |
| 4e) | 747.000 | 670.000 | | n.d. | n.d. |
| 4f) | 548.000 | 511.000 | 10 | 90 | 95 |
| | | | 20 | 70 | 80 |
| | | | 30 | 35 | 45 |
| 4g) | 417.000 | 382.000 | 10 | 90 | 95 |
| | | | 20 | 75 | 80 |
| | | | 30 | 50 | 75 |
| 4h) | 649.000 | 541.000 | | n.d. | n.d. |

n.d.: Measurement was not carried out.

EXAMPLE 5

Testing the Properties of the Fresh Mortars:

a) Determination of Viscosity:

The viscosity of the fresh mortars from example 4 was determined immediately after mixing using the Brookfield Helipath viscometer (5 rpm, spindle T96) at room temperature.

b) Determination of Wettability:

The fresh mortars produced in example 4 were allowed to stand for 10 min and then mixed up again with the hand mixer for 20 seconds.

This was followed by determination of the wettability in accordance with DIN EN 1347. In the test, instead of glass plates, unglazed type Bla ceramic tiles (EN 12004) measuring 5 cm×5 cm were laid after 10, 20, and 30 min.

After a total of 40 min, the tiles were turned over and the wetting of the back of the tiles determined as a percentage of the total tile area.

The results of the testing are summarized in Table 1 above.

EXAMPLE 6

Mortar having a lower proportion of methyl cellulose Tylose MH 60.004 P6.

Production of the Dry Mortars:

i) Test Mortar:

In analogous manner to example 3c), but dosing with about 20% by weight less of methylcellulose (Tylose MH 60.004 P6):

320.2 g of Milke CEM I 42.5N cement, 331.5 g of F31 quartz sand, 331.2 g of F36 quartz sand, 9.7 g of VINNAPAS 5010 N, and 2.16 g of Tylose MH 60.004 P6 were mixed in a Toni mixer for 15 min.

ii) Test Mortar:

In analogous manner to example 3d), but dosing with about 20% by weight less of methylcellulose (Tylose MH 60.004 P6):

320.2 g of Milke CEM I 42.5N cement, 331.5 g of F31 quartz sand, 331.2 g of F36 quartz sand, 5.0 g calcium formate, 9.7 g of VINNAPAS 5010 N, and 2.16 g of Tylose MH 60.004 P6 were mixed in a Toni mixer for 15 min Tylose MH 60.004 P6.

Mixing of the Fresh Mortars:

i) Test Mortar:

In analogous manner to example 4c), 198.9 g of the dry mortar produced in example 6i) was sprinkled into the aqueous mixture produced in example 2c) while mixing. The mixture was mixed with the hand mixer. The total mixing time was 20 sec.

ii) Test Mortar:

In analogous manner to example 4d), 199.9 g of the dry mortar produced in example 6ii) was sprinkled into the aqueous mixture produced in example 2d) while mixing. The mixture was mixed with the hand mixer. The total mixing time was 20 sec.

Testing the Properties of the Fresh Mortars:

The viscosity and wettability were tested as described for example 5.

The results are summarized in Table 2.

TABLE 2

Properties of the fresh mortars from example 6:

| Example | Viscosity [mPa · s] Reference mortar 4c) | Test mortar 6i) | Time [min] | Wettability Reference mortar 4c) [%] | Test mortar 6i) [%] |
|---|---|---|---|---|---|
| | 810.000 | 533.000 | 10 | 80 | 90 |
| | | | 20 | 60 | 70 |
| | | | 30 | 25 | 30 |
| **Example** | **Reference mortar 4d)** | **Test mortar 6ii)** | **Time [min]** | **Reference mortar 4d) [%]** | **Test mortar 6ii) [%]** |
| | 770.000 | 534.000 | 10 | 90 | 95 |
| | | | 20 | 65 | 85 |
| | | | 30 | 35 | 40 |

The examples with the inventive test mortars 6i) and 6ii) show that, by comparison with the corresponding reference mortars from examples 4c) and 4d), it is possible with the procedure according to the invention to reduce the amount of the thickener methylcellulose used and still improve the wettability of the mortars or even to reduce the amount of methylcellulose further and still be able to adjust the wettability to an acceptable value.

In addition, the inventive test mortars from example 6) advantageously also have a lower viscosity than the corresponding reference mortars from examples 4c) and 4d).

COMPARATIVE EXAMPLE 7

The aqueous premixes for comparative example 7 comprised superabsorber, but no further additives.

i) Production of the Aqueous Premix Containing Superabsorber:

0.3 g of superabsorber II was mixed with and suspended in 200 ml of water in a Thinky ARE 250 planetary mixer for 5 min at room temperature.

ii) Production of the Dry Mortars:

c) The reference mortar differed from the test mortar from example 3c) in that calcium formate was added to the dry mortar:

320.0 g of Milke CEM I 42.5N cement, 331.3 g of F31 quartz sand, 331.0 g of F36 quartz sand, 9.7 g of VINNAPAS 5010 N, 2.7 g of Tylose MH 60.004 P6, and 5.0 g of calcium formate were mixed in the Toni mixer for 15 min.

d) The reference mortar differed from the test mortar from example 3d) in that Casucol Fix1 was added to the dry mortar:

320.0 g of Milke CEM I 42.5N cement, 331.3 g of F31 quartz sand, 331.0 g of F36 quartz sand, 9.7 g of VINNAPAS 5010 N, 2.7 g of Tylose MH 60.004 P6, and 0.5 g of Casucol Fix1 were mixed in the Toni mixer for 15 min.

e) The reference mortar differed from the test mortar from example 3e) in that Agitan P804 was added to the dry mortar:

320.0 g of Milke CEM I 42.5N cement, 331.3 g of F31 quartz sand, 331.0 g of F36 quartz sand, 9.7 g of VINNAPAS 5010 N, 2.7 g of Tylose MH 60.004 P6, and 0.4 g of Agitan P804 were mixed in the Toni mixer for 15 min.

iii) Mixing the Fresh Mortars:

c) Reference mortar:

199.9 g of the dry mortar produced in comparative example 7-ii-c) was sprinkled into 40.06 g of the premix produced in comparative example 7-i) while mixing. The mixture was mixed with the hand mixer. The total mixing time was 20 sec.

d) Reference mortar:

199.0 g of the dry mortar produced in comparative example 7-ii-d) was sprinkled into 44.06 g of the premix produced in comparative example 7-i) while mixing. The mixture was mixed with the hand mixer. The total mixing time was 20 sec.

e) Reference mortar:

199.0 g of the dry mortar produced in comparative example 7-ii-e) was sprinkled into 40.06 g of the premix produced in comparative example 7-i) while mixing. The mixture was mixed with the hand mixer. The total mixing time was 20 sec.

Testing the Properties of the Fresh Mortars:

The viscosity and wettability of the fresh mortars were tested as described for example 5.

The results are summarized in Table 3.

TABLE 3

Properties of the fresh mortars from comparative example 7 and examples 4c-e):

| | Viscosity [mPa · s] | | Wettability | | |
|---|---|---|---|---|---|
| Example | Test mortar 4c) | Reference mortar 7-iii-c) | Time [min] | Test mortar 4c) [%] | Reference mortar 7-iii-c) [%] |
| | 682.000 (4c) | 741.000 | 10 | 95 | 90 |
| | | | 20 | 80 | 70 |
| | | | 30 | 45 | 30 |
| Example | Test mortar 4d) | Reference mortar 7-iii-d) | Time [min] | Test mortar 4d) [%] | Reference mortar 7-iii-d) [%] |
| | 643.000 (4d) | 719.000 | 10 | 95 | 90 |
| | | | 20 | 85 | 70 |
| | | | 30 | 55 | 40 |
| Example | Test mortar 4e) | Reference mortar 7-iii-e) | Time [min] | Test mortar 4e) [%] | Reference mortar 7-iii-e) [%] |
| | 670.000 (4e) | 750.000 | | n.d. | n.d. |

n.d.: Measurement was not carried out.

The comparison of the inventive test mortars 4c-e) with the reference mortars from comparative examples 7-iii) shows that the viscosity and wettability of the fresh mortars were improved by introducing the superabsorbers and additives into the mortar in the form of a premix. By contrast, conventional separate introduction of the superabsorbers and additives into the mortar, as was done in comparative example 7-iii), did not achieve the desired effects.

The invention claimed is:

1. A mixture, comprising:

wherein the mixture contains 0.5% to 10% by weight of one or more superabsorbent polymers and 30% to 99.5% by weight of one or more protective-colloid-stabilized polymers based on one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins, dienes, vinylaromatics, and vinyl halides and optionally one or more additives;

where the percentages by weight are based on the dry weight of the mixture;

wherein no mineral binder is present; and wherein the mixture is a water-dispersible powder.

2. The mixture of claim 1, wherein the one or more superabsorbent polymers are based on (i) one or more ethylenically unsaturated monomers bearing ionic groups, (ii) one or more crosslinking, ethylenically unsaturated monomers, (iii) optionally one or more monoethylenically unsaturated, nonionic monomers bearing (meth)acrylamido groups, and (iv) optionally one or more other monoethylenically unsaturated hydrophilic monomers.

3. The mixture of claim 1, wherein the one or more superabsorbent polymers are based on (i) 19.9 to 49.9 mol % of 2-acrylamido-2-methylpropanesulfonic acid, 50 to 80 mol % of acrylamide, and also a crosslinking monomer selected from the group comprising triallylamine, N,N'-methylenebisacrylamide, and pentaerythritol triallyl ether, (ii) 19.9 to 49.9 mol % of (meth)acrylic acid, 50 to 80 mol % of acrylamide, and also a crosslinking monomer selected from the group comprising triallylamine, N,N'-methylenebisacrylamide, and pentaerythritol triallyl ether, or (iii) 19.9 to 49.9 mol % of [3-(acryloylamino) propyl] trimethylammonium chloride, 50 to 80 mol % of acrylamide, and a crosslinking monomer selected from the group comprising triallylamine, N,N'-methylenebisacrylamide, and pentaerythritol triallyl ether.

4. The mixture of claim 1, wherein the one or more polymers based on one or more ethylenically unsaturated monomers are selected from the group comprising vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

5. The mixture of claim 1, wherein the one or more polymers based on one or more ethylenically unsaturated monomers are selected from the group comprising vinyl acetate homopolymers; copolymers of vinyl acetate with 1% to 40% by weight of ethylene; copolymers of vinyl acetate with 1% to 40% by weight of ethylene and 1% to 50% by weight of one or more further comonomers from the group of the vinyl esters having 1 to 12 carbon atoms in the carboxyl radical; copolymers of vinyl acetate, 1% to 40% by weight of ethylene, and 1% to 60% by weight of acrylic esters of unbranched or branched alcohols having 1 to 15 carbon atoms; copolymers with 30% to 75% by weight of vinyl acetate, 1% to 30% by weight of vinyl laurate or vinyl esters of an alpha-branched carboxylic acid having 5 to 13 carbon atoms, and also 1% to 30% by weight of acrylic esters of unbranched or branched alcohols having 1 to 15 carbon atoms, which may additionally contain 1% to 40% by weight of ethylene; copolymers with vinyl acetate, 1% to 40% by weight of ethylene, and 1% to 60% by weight of vinyl chloride; copolymers of n-butyl acrylate or 2-ethylhexyl acrylate; copolymers of methyl methacrylate with n-butyl acrylate and/or 2-ethylhexyl acrylate and optionally ethylene; styrene-acrylic ester copolymers with one or more monomers from the group of methyl acrylate, ethyl acrylate, propyl acrylate, n-butyl acrylate, 2-ethylhexyl acrylate; vinyl acetate-acrylic ester copolymers with one or more monomers from the group consisting of methyl acrylate, ethyl acrylate, propyl acrylate, n-butyl acrylate, 2-ethylhexyl acrylate, and optionally ethylene; styrene-1,3-butadiene copolymers; and wherein the figures in % by weight add up to 100% by weight in each case.

6. The mixture of claim 1, wherein the one or more protective colloids are selected from the group comprising polyvinyl alcohols; polyvinyl acetals; polyvinylpyrrolidones; polysaccharides in water-soluble form; proteins; lignosulfonates; poly(meth)acrylic acid, copolymers of (meth) acrylates with carboxy-functional comonomer units, poly (meth)acrylamide, polyvinylsulfonic acids, and the water-soluble copolymers thereof; melamine-formaldehyde sulfonates, naphthalene-formaldehyde sulfonates, styrene-maleic acid copolymers and vinyl ether-maleic acid copolymers.

7. The mixture of claim 1, wherein the mixture is used as leveling compounds, plasters, spackling compounds, jointing mortars, tile adhesives, full thermal insulation adhesives, sealing slurries or for producing thermal insulation composite systems.

8. A process for producing mixtures, comprising:

mixing 0.5% to 10% by weight of one or more superabsorbers and 30% to 99.5% by weight of one or more protective-colloid-stabilized polymers based on one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins, dienes, vinylaromatics, and vinyl halides and optionally one or more additives, wherein the percentages by weight are based on the dry weight of the mixtures, wherein no mineral binder is used and wherein the mixture is a water-dispersible powder.

9. A process for producing a building material formulation, comprising:

mixing one or more mineral binders, optionally one or more fillers, and optionally one or more additions; and admixing one or more mixtures comprising 0.5% to 10% by weight of one or more superabsorbent polymers and 30% to 99.5% by weight of one or more protective-colloid-stabilized polymers based on one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins, dienes, vinylaromatics, and vinyl halides and optionally one or more additives, where the percentages by weight are based on the dry weight of the mixture, wherein no mineral binder is present and wherein the building material formulation is a water-dispersible powder.

10. The mixture of claim 1, wherein the mixture is free of water.

* * * * *